Aug. 18, 1964　　　L. L. KEHL　　　3,144,720
TEACHING MACHINE
Filed April 6, 1962
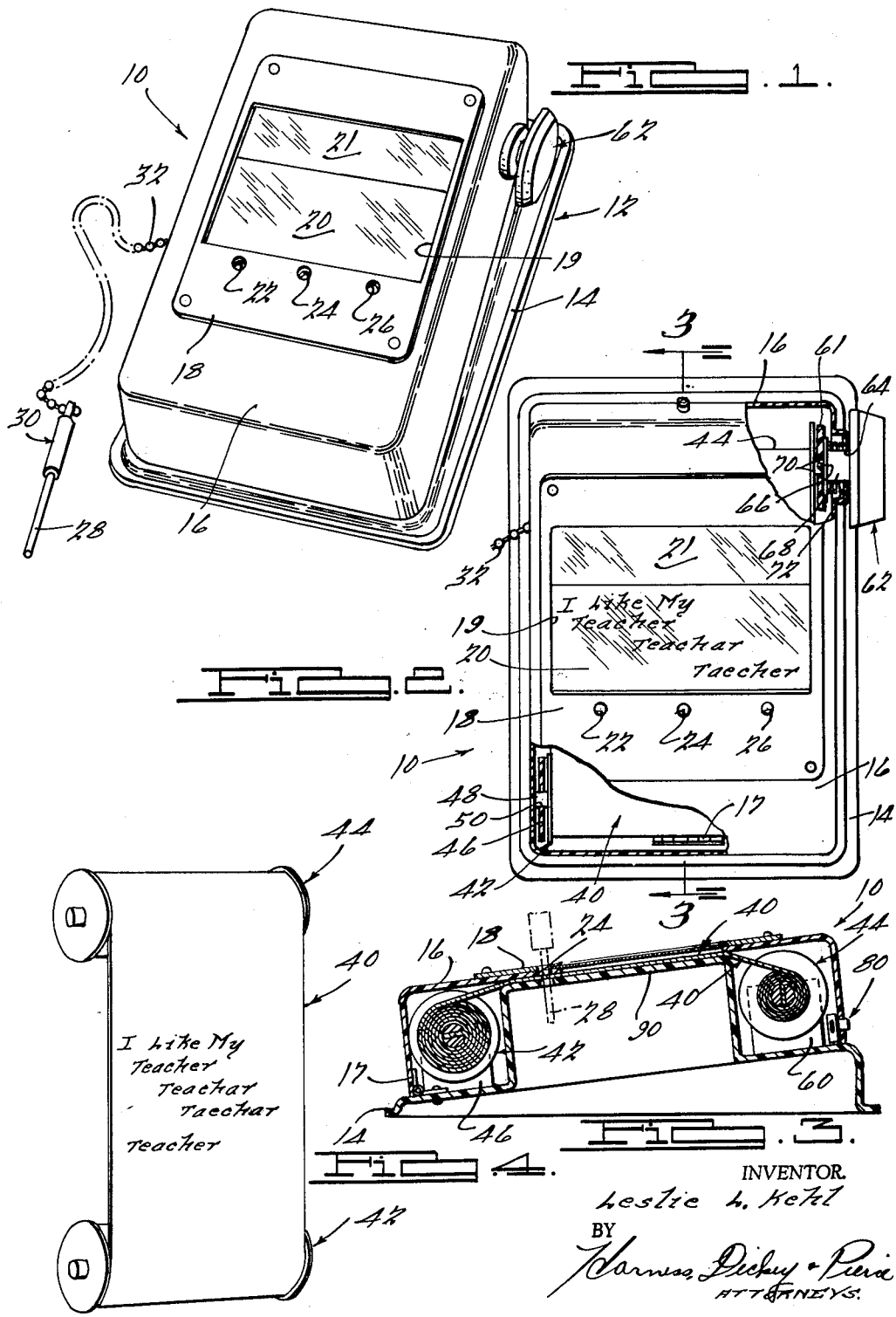
INVENTOR.
Leslie L. Kehl
BY
Harness, Dickey & Pierce
ATTORNEYS.

United States Patent Office 3,144,720
Patented Aug. 18, 1964

3,144,720
TEACHING MACHINE
Leslie L. Kehl, 15020 Fairlane, Livonia, Mich.
Filed Apr. 6, 1962, Ser. No. 185,657
1 Claim. (Cl. 35—9)

The present invention relates generally to teaching machines and more particularly to a teaching machine that applies a basic principle of learning to programmed instruction.

It is well known that confirmation of a correct answer immediately following a thinking process tends to result in the retention of the correct answer. The process is implemented by supplying the correct answer immediately subsequent to the selection of an answer incident to the thinking process. In addition, questions are preferably in graded steps of difficulty and a systematic review of the correct answers is provided to assure retention.

The teaching machine of the instant invention offers a novel solution to two problems currently limiting the wider application of programmed instruction, namely, (1) the lack of programmed instructive material below the secondary school level and (2) the high cost of supplying many pupils with programmed learning.

Teaching machines currently known and used generally require an answer to be written into an appropriate blank. However, children find little difference in using a pencil in programmed learning and using a pencil in normal school work. Thus, there is a lack of appeal that results in a failure to retain a child's interest over a period of time.

A programmed teaching machine in accordance with the instant invention appeals to children and maintains an interest in both the teaching machine and the learning process.

A very necessary feature of a teaching machine is that the correct answer be hidden until the thought process has taken place and a proper answer selected. This is accomplished, in the machine of the instant invention, by utilizing a winding mechanism that advances a programmed roll in one direction only. A positive means of marking the roll is provided so that the roll must be in a predetermined location, at which time the correct answer cannot be seen. Movement of the roll to sneak a look at the correct answer would result in placement of the positive answer mark at an incorrect location, which would invalidate the answer.

The time spent by an instructor or parent in directing a child's learning process consists merely of handing a child a programmed tape. After placement of the tape in the machine, the child may be allowed to proceed at his own rate. After completing the programmed tape, the child can return the completed roll to the instructor, who can immediately determine the degree of learning achieved by the child. Correction is relatively simple, since perforations will appear directly adjacent the answers and are easily evaluated at a glance. Any perforation not in the proper location is noted with little difficulty and immediately informs the corrector of the specific item not fully learned.

The teaching machine of the instant invention is unique because it utilizes a programmed roll that does not require a write-in space and is therefore relatively small in size. Further, the programmed tape is relatively easily and quickly corrected. Both the machine and the tape can be produced in quantity at a relatively low cost.

The type of programming offered by the teaching machine of the instant invention has proven itself to be effective at any grade level since no writing is required. The machine merely requires the punching of the roll at a selected answer, or, in other words, offers a multiple choice selection between answers. It is therefore adaptable for use by children as young as four years, who are incapable of writing out a correct answer.

Accordingly, one object of the present invention is an improved teaching machine.

Another object is an improved teaching machine that utilizes programmed learning.

Another object is a teaching machine that is relatively easily corrected.

Another object is a teaching machine that does not require write-in answers.

Another object is a teaching machine that precludes cheating.

Another object is a teaching machine that can be operated by a relatively young child.

Another object is a teaching machine that can be produced at a relatively low cost.

Other objects and advantages of the instant invention will be apparent from the following description, claim and drawings, wherein:

FIGURE 1 is a perspective view of a teaching machine in accordance with an exemplary constructed embodiment of the instant invention;

FIG. 2 is a top view of the teaching machine of FIGURE 1;

FIG. 3 is a cross sectional view taken substantially along the line 3—3 of FIG. 2; and FIG. 4 is a view of a programmed tape removed from the teaching machine.

A teaching machine 10 in accordance with an exemplary embodiment of the instant invention comprises an enclosure 12 made from, for example, metal or plastic. The enclosure 12 comprises a base portion 14 and a cover portion 16 pivotally supported for rotation with respect to the base 14 as by a hinge 17. The cover portion 16 includes a cover plate 18 having an aperture 19 therein that is covered over in part by a rectangular section of clear glass or plastic 20, and in part by a rectangular section of amber or other colored glass or plastic, 21, the purpose of which will be described hereinafter.

The cover portion 16 has a plurality of laterally spaced apertures 22, 24 and 26 therein for the acceptance of a terminal end portion 28 of a punch 30. The punch 30 is secured to the base portion 14 of the machine 10 as by a chain 32.

As best seen in FIGS. 2, 3 and 4, a programmed tape 40 is supported on a pair of spools 42 and 44. The spool 42 originally carries the tape 40, and the spool 44 functions as a takeup spool. The spool 42 is supported in a pair of spaced upstanding relatively flexible spool support flanges 46 (one of which is shown), on the base 14. The flanges 46 are relatively flexible to provide for insertion of stub shafts 48 on the spool 42 into complementary apertures 50 therein. The takeup spool 44 is supported in a pair of spaced flanges 60 and 61 on the base 14 in a manner similar to the spool 42.

A winding knob 62 is supported in a complementary aperture 64 in the cover portion 16 and has a rib 66 at an inner end 68 thereof that is engageable in a complementary slot 70 in the spool 44 to facilitate rotation of the spool 44. It will be appreciated that the tape 40 can be effectively advanced in only one direction. However, to insure this mode of operation, the slot 70 can be relieved on one side so as to provide a one-way ratchet.

The knob 62 is normally biased inwardly by a helical compression spring 72 so that the rib portion 66 thereof is engageable in the slot 70 in the spool 44.

A suitable lock 80 may be provided to effect locking of the cover portion 16 with respect to the base 14. It is to be noted that the base portion 14 has an upstanding center portion 90 that directly underlies and supports the tape 40. The center portion 90 is provided with apertures aligned with apertures 22, 24 and 26 in the cover portion 16 so that, upon insertion of the end portion 28 of the punch 30 through a selected one of the apertures 22, 24 or 26, a clean hole is punched in the tape 40.

The program for the tape 40 consists of questions, together with answers of a multiple choice nature, which appear at the same time within the area of the window space 20. The correct answer does not appear until the tape 40 is advanced and then appears in vertical alignment with the correct multiple choice. Should a user advance the tape 40 too far, his choice of answer, designated by the perforation, will not appear in its proper place, thus rendering the improper operation apparent at a glance.

After the material is introduced, the amber portion 21 provides for review of the answer to lend continuity to the learning process. This process is followed despite a variation in the material being programmed. Facts or concepts being taught are introduced first in a simple manner and are then programmed toward difficult questions. Wrong responses at the beginning may be expected. However, learning will result because the correct answer is given immediately after the thinking process has taken place.

The tape 40 preferably repeats the facts or concepts being presented in a different way and in a different order. Such a review reveals the possibility of an incorrectly learned response on the basis of position or faulty association. The overall length of the tape is quite flexible and depends upon the type of material being presented, the number of reviews necessary to establish the material in the student's mind, and the age and the attention span of the individual being tested.

It is to be understood that the specific construction of the improved teaching machine herein disclosed and described is presented for the purpose of explanation and illustration and is not intended to indicate limits of the invention, the scope of which is defined by the following claim.

What is claimed is:

A manually operable teaching machine comprising an enclosure having a relatively large aperture therein, a pair of rolls in said enclosure on opposite sides of the aperture therein, a programmed imperforate tape on one of said rolls advanceable in one direction only past the aperture in said enclosure onto the other of said rolls, said tape having questions with multiple choice answers thereto appearing simultaneously within the aperture in said enclosure, the multiple choice answers to the questions being in laterally spaced relation relative to the direction of movement of said tape, a plurality of relatively small apertures in said enclosure in laterally spaced relation relative to the direction of movement of said tape so as to be aligned with the multiple choice answers to the questions, and a punch insertable through a selected one of said relatively small apertures for perforating and permanently marking said tape, said tape having the correct answer to the question thereon which appears upon advancement of said tape.

References Cited in the file of this patent
UNITED STATES PATENTS

| | | |
|---|---|---|
| 2,062,453 | Hastings | Dec. 1, 1936 |
| 2,169,266 | Matter | Aug. 15, 1939 |
| 2,197,306 | Ingraham | Apr. 16, 1940 |
| 2,943,400 | Griswold | July 5, 1960 |